United States Patent
Brueggen et al.

[19]

[11] Patent Number: 5,988,293
[45] Date of Patent: Nov. 23, 1999

[54] GAUGE STRUCTURE FOR A CYLINDER OPERATED DEPTH CONTROL

[75] Inventors: Shane Julius Brueggen, Geneseo; Robert Edwin Bennett, Moline; William Douglas Graham, East Moline; Richard Hugo Clark, Geneseo; Loyd Thomas Hubbard, Jr., Hampton, all of Ill.

[73] Assignee: Deere & Company, Moline, Ill.

[21] Appl. No.: 09/076,461

[22] Filed: May 12, 1998

[51] Int. Cl.[6] .................................................. A01B 63/16
[52] U.S. Cl. ......................... 172/414; 172/413; 172/423; 172/417
[58] Field of Search ....................... 172/395, 397, 172/414, 418, 421, 422, 423, 407, 501, 502, 503, 413, 417

[56] References Cited

U.S. PATENT DOCUMENTS

| | | | |
|---|---|---|---|
| 2,939,539 | 6/1960 | Kramer | 172/396 |
| 2,994,544 | 8/1961 | Wolf | 280/43.23 |
| 3,177,976 | 4/1965 | Wenzel | 188/67 |
| 3,260,315 | 7/1966 | Day | 172/413 |
| 3,700,043 | 10/1972 | Sullivan | 171/414 X |
| 3,809,165 | 5/1974 | Miller | 172/328 |
| 4,073,345 | 2/1978 | Miller | 172/413 |
| 4,276,814 | 7/1981 | Bass et al. | 92/23 |
| 4,469,014 | 9/1984 | Nelson | 92/13 |
| 4,475,601 | 10/1984 | Harden et al. | 172/283 |
| 5,167,286 | 12/1992 | Bossler | 172/414 |
| 5,366,024 | 11/1994 | Payne | 172/318 |
| 5,427,184 | 6/1995 | Peck | 172/395 |

OTHER PUBLICATIONS

Case–IH Brochure, pp. 10–11, date and location of publication–unknown.

*Primary Examiner*—Victor Batson

[57] ABSTRACT

A stroke limiting structure for use with a lift control system on an implement includes a reciprocating link operably connected to a hydraulic cylinder and to a lift wheel assembly on an implement frame section. The link is connected by a lost motion connection to depth gauging structure including gauge plates pivotally supported on a carrier. The plates are rotatable between disengaged and engaging positions without need for tools and are maintained together on the carrier to eliminate loose parts that could be misplaced or lost. The plates in the engaging position determine the lowermost position of the implement and provide a positive mechanical stop for the implement to eliminate depth control problems caused by cylinder leakage or the like. The lost motion connection eliminates unwanted movement of the plate carrier and facilitates gauge plate pivoting for depth adjustments.

19 Claims, 3 Drawing Sheets

GAUGE STRUCTURE FOR A CYLINDER OPERATED DEPTH CONTROL

BACKGROUND OF THE INVENTION

1) Field of the Invention

The present invention relates generally to agricultural implements and, more specifically, to a depth control adjustment for cylinder operated lift system on an implement.

2) Related Art

Hydraulically operated lift structures on an agricultural implement often include hydraulic or mechanical stops to adjust position of the implements. For example, on tillage and seeding equipment frames, hydraulic depth controls of the type shown and described in U.S. Pat. Nos. 5,427,184 and 5,366,024 provide adjustable hydraulically operated down stops but require relatively complex linkage arrangements. Series cylinder hydraulic systems are also commonly utilized, but cylinder or other system leakage can adversely affect the depth setting in systems which require cylinder pressure to hold a preselected depth setting. Various mechanical stop systems, such as cylinder collars or donuts placed over the rod of a hydraulic cylinder provide a solid mechanical stop, and the number or size of the collars can be changed to adjust implement position. However, such adjustments are time-consuming, particularly if the cylinder is located in a position that is hard to access. Small changes in implement position are often difficult to achieve with many of the previously available, and individual adjusting components usually require a separate storage area and are easily lost or misplaced. Heretofore, providing a relatively simple and inexpensive mechanical stop that is reliable and yet easy to adjust for different implement positions has been a continuing problem.

BRIEF SUMMARY OF THE INVENTION

It is therefore an object of the present invention to provide an improved implement position control structure. It is a further object to provide such a structure which overcomes most or all of the aforementioned problems.

It is a further object of the present invention to provide an improved implement position control structure for a hydraulically operated system which is relatively simple and inexpensive and yet is easy to adjust. It is another object to provide such a structure which obviates cylinder collars and provides a large number of position mechanical settings without loose parts that could be easily lost or misplaced. It is still another object to provide such a structure which can be adjusted without tools and without removing or adding components.

In accordance with the above objects, a stroke limiting structure for use with a lift control system on an implement includes a reciprocating link operably connected to a hydraulic cylinder and to a lift wheel assembly on an implement frame section. The link is connected by a lost motion connection to depth gauging structure including gauge plates pivotally supported on a carrier. The plates are easily rotatable between disengaged and engaging positions without need for tools and are maintained together on the carrier to eliminate loose parts that could be misplaced or lost. The plates in the engaging position determine the lowermost position of the implement and provide a positive mechanical stop for the implement to eliminate depth control problems caused by cylinder leakage or the like. The lost motion connection eliminates unwanted movement of the plate carrier and facilitates gauge plate pivoting for depth adjustments.

These and other objects, features and advantages of the present invention will become apparent to one skilled in the art upon reading the following detailed description in view of the drawings.

DETAILED DESCRIPTION OF THE DRAWINGS

Figure 1:
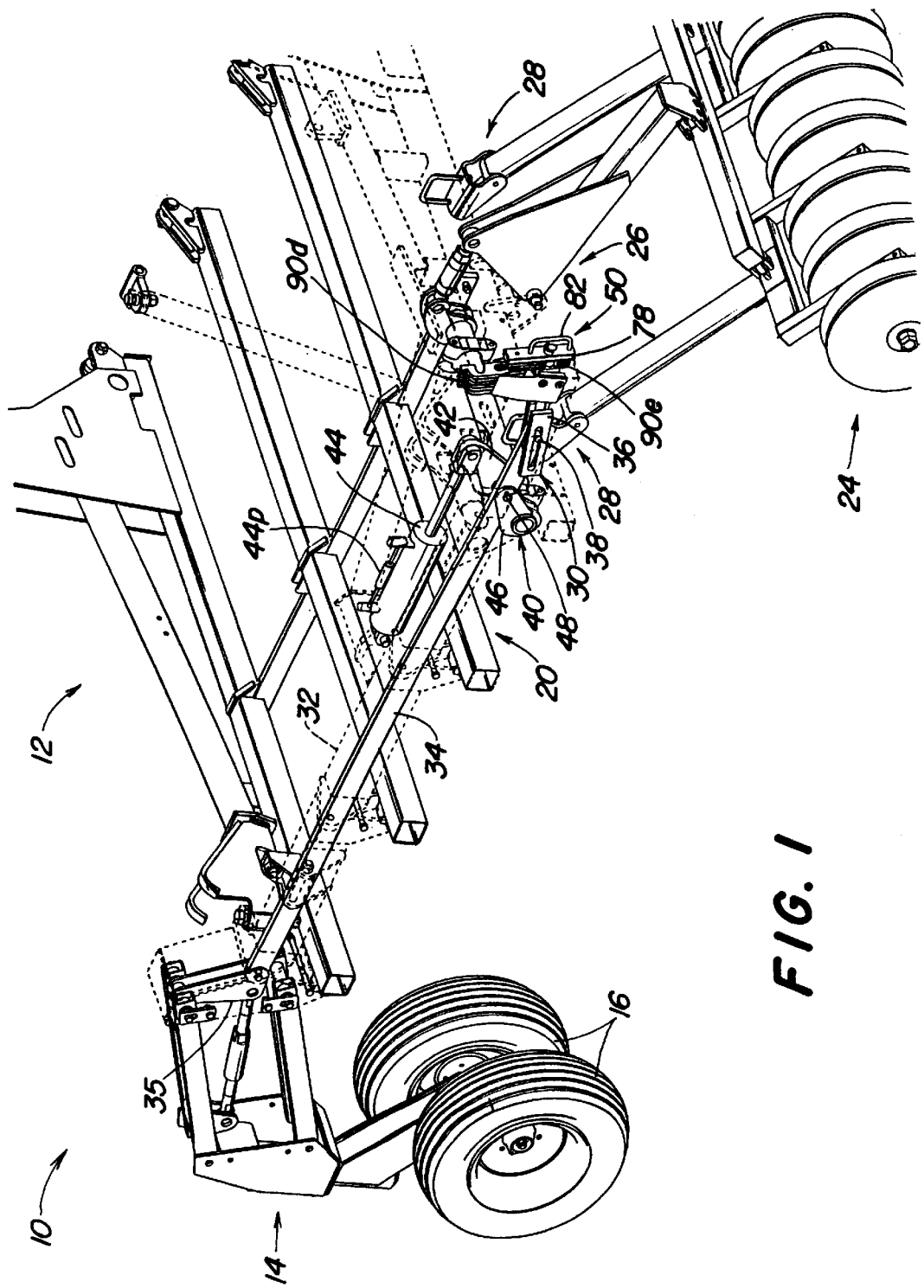
FIG. 1 is a rear perspective view of a portion of an implement having an adjustably hydraulic depth control.

Referring now to drawings, therein is shown an implement 10 having a plurality of frame sections 12, only one of which is shown, each with a pivoting lift wheel structure 14 having ground wheels 16 supporting the implement 10 for forward movement over the ground. A lift control system 20 is connected to the lift wheel structure 14 for raising and lowering the frame section 12 between transport and field working positions and for adjusting the working depth when the section is in the field working position. Trailing wheel structures 24, shown in FIG. 1 as press wheels pivotally supported at locations 26 and 28 from the frame section 12, are adjustable to control the height of the aft end of the frame section.

The lift control system 20 includes fore-and-aft extending link structure 30 at least partially contained within an end support tube 32 of the section 12. The link structure 30 includes a forward link 34 connected to a lift arm assembly 35 on the lift wheel structure 14 for pivoting the structure 14 to raise and lower the wheels 16 relative to the frame. The link structure 30 also includes an aft link 36 connected by a slotted lost motion connection 38 to the aft end of the forward link 34.

A crank assembly 40 (FIG. 1) is pivotally connected to the aft crank of the section 12 for rocking about an axis transverse to the forward direction. The crank assembly 40 includes an inner upright arm 42 connected to a rod end of a hydraulic lift cylinder 44 having a base end connected to the frame section 12. An outer arm 46 is connected for rocking with the inner arm 42 about the transverse axis as the cylinder 44 is extended and retracted. Pivot structure 48 connects the upper end of the arm 46 to the forward link 34 to move the link 34 generally in an axial, fore-and-aft direction within the tube 32. As the link 34 is moved forwardly by retraction of the cylinder 44, the lift arm assembly 35 pivots to raise the wheels 16 relative to the frame section 12 and lower the implement 10. Extending the cylinder 44 moves the link 34 rearwardly to pivot the assembly 35 in the opposite direction to raise the implement 10 towards a transport position.

Adjustable stroke limiting structure 50 is connected to the aft link 36 to limit the movement of the link 34 in the forward direction to thereby provide an adjustable positive mechanical stop to set the lowermost position or working depth of the implement 10. The lost motion connection 38 allows the forward link 34 to move with extension and retraction of the cylinder 44 while a substantial portion of the stroke limiting structure 50 remains relatively stationary on the frame section 12. The connection 38 also facilitates easy adjustment of the stop position of the link structure 30, as will be described in detail below.

Figure 2:
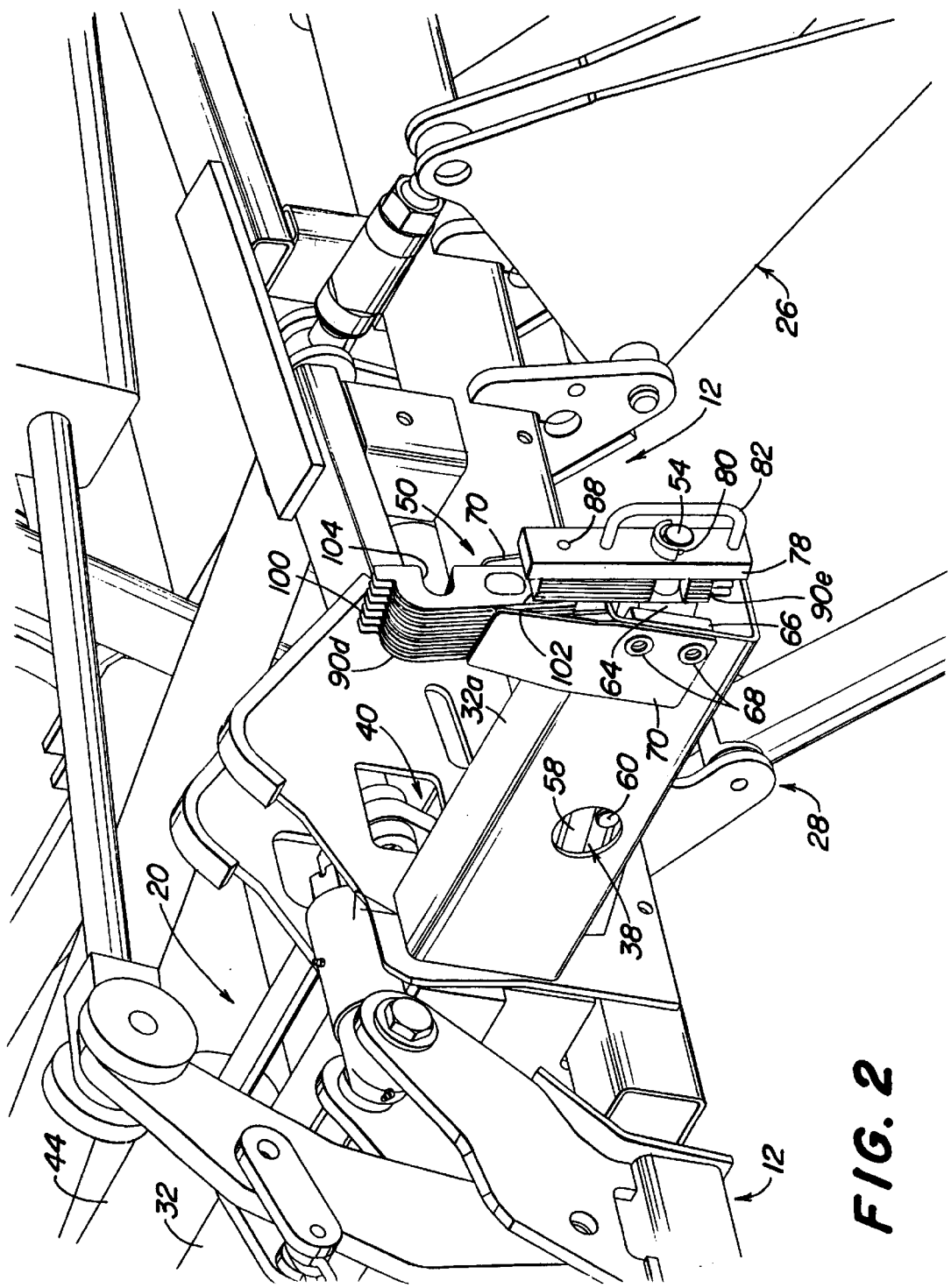
FIG. 2 is an enlarged view of a portion of the implement shown in FIG. 1 and showing details stroke limiter for the depth control system.
Figure 3:
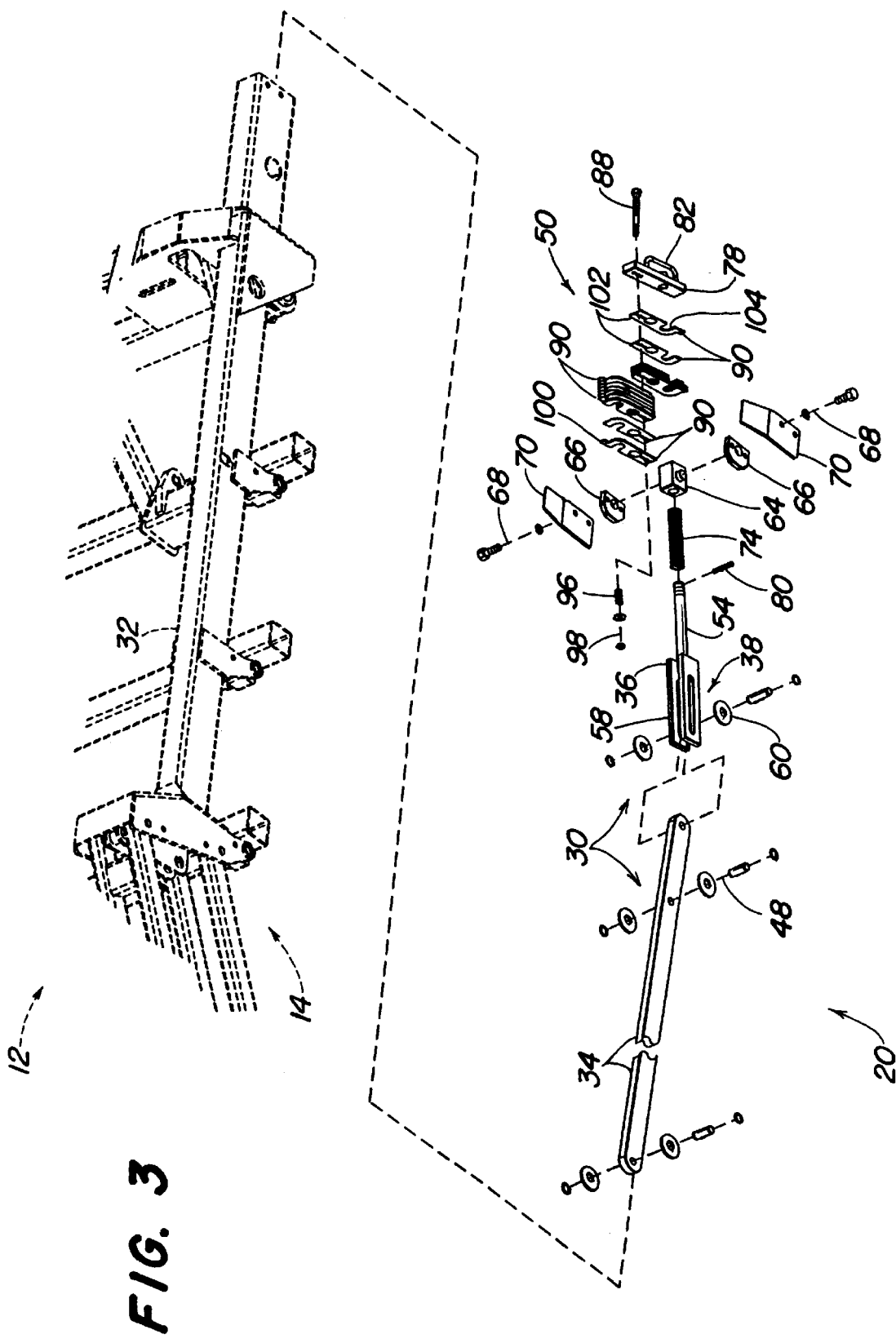
FIG. 3 is an exploded view of the stroke limiter of FIG. 2.

Referring to FIGS. 2 and 3, the aft link 36 supports the limiting structure 50 and includes a rod member 54 fixed to a pair of transversely spaced, slotted side members 58. The members 58 are pinned by pivot structure 60 to the aft end of the link 34 to define the lost motion connection 38 between the link sections. The rod member 54 is slidably received through a pivot block 64 connected for rocking about a transverse axis to inner support plates 66 mounted within an aft tube section 32a. Pairs of cap screws and washers 68 mount upright supports 70 on the outsides of the tube section 32a and secure the inner support plates 66 in position. A spring 74 is compressed between the pivot block 64 and the slotted members 58 to bias the rod member 54 to the left as viewed in FIG. 3. An end plate or plate carrier 78 is screwed onto the aft threaded end of the rod member 54, and a pin 80 inserted through a small bore at the threaded end maintains the plate 78 in an upright position. An operator handle 82 is secured to the plate 78, and a cap screw or pivot 88 projects forwardly through an upper aperture in the plate. A plurality of generally flat gauge or adjusting plates 90 (FIG. 3) are mounted on the pivot 88 for individual rotation about the axis of the pivot between an upper disengaged position (see plates 90d of FIG. 2) and a lowered engaging position (90e of FIG. 2). A plate retaining spring 96 (FIG. 3) is secured over the forward end of the pivot 88 by a lock nut and washer 98 to maintain the plates sandwiched together between the spring 96 and the forward face of the end plate 78.

Each of the plates 90 includes a tab 100 on the end opposite the pivot area (indicated generally at 102), and a notch 104 conforming generally to the shape of the rod member 54. The center of the notch 104 and the center of the rod member 54 are offset approximately an equal distance from the pivot 88 so that as a plate 90 is rotated approximately 180 degrees in the clockwise direction (as viewed in FIG. 2) from the upper disengaged position 90d to the lowered engaging position 90e the notch 104 will move over the rod member 54. The pivot area 102 preferably includes mating indentations and protrusions which engage in both the disengaged and engaging positions and are maintained in contact with each other by the bias of the spring 96 to help retain the plates 90 in the selected positions. The disengaged plates 90d are retained between the insides of the upright supports 70 as the rod member 54 is urged to the left by the bias of the spring 74. The engaging plates 90e form a solid mechanical stop as they are sandwiched in order between the pivot block 64 and the forward face of the end plate 78.

As the cylinder 44 is retracted, the link 34 moves forwardly, and the frame section 12 lowers as the wheels 14 move upwardly relative to the frame section. The pivot structure 60 of the lost motion connection 38 between the links 34 and 36 slides forwardly in the slots of the side members 58 (FIG. 3) until the structure 60 bottoms against the forward end of the slots. The link 36 then mechanically retains the wheel structure 14 in the lowered position which is determined by the number of the plates 90e in the engaged position. Preferably, the cylinder 44 includes a pressure responsive bypass valve 44p to limit pressure on the lift linkage when the linkage bottoms against the adjustable stop and to provide continued flow to any series connected cylinders on linkages not yet bottomed against their stops.

To adjust the lowermost working position of the section frame 12, the operator simply extends the cylinder 44 to raise the frame section and remove tension from the link 36. The operator then pulls the handle 82 to move the rod member 54 rearwardly (to the right) and rotates the plates 90 about the axis of the pivot 88 to change the number of plates in the engaging position 90e and thereby change the axial position of the rod member 54. The operator releases the handle 82, and the spring 74 firmly sandwiches the plates 90e between the end plate 78 and the pivot block 64 to establish the stroke limit stop for forward movement of the link 34. The lost motion connection 38 thereby facilitates easy stroke limit adjustments without tools and reduces movement of the end plate 78 and handle 82 as the forward link 34 reciprocates within its adjusted stroke range.

Having described the preferred embodiment, it will become apparent that various modifications can be made without departing from the scope of the invention as defined in the accompanying claims. For example, although the gauge plates are shown pivotally connected to a carrier on the rod member 54, the plates may be pivotally mounted directly on the frame. Also, the gauge structure may be mounted adjacent or directly on the cylinder 44 next to the cylinder rod so the plates 90 can be pivoted directly over the cylinder rod.

We claim:

1. In a lift control system for an implement including a frame section adapted for movement over the ground, the lift control system including a cylinder controlled linkage, adjustable stop structure comprising: a movable rod; and a stroke limiter for limiting the stroke of the linkage and thereby adjusting a position of a portion of the implement relative to the ground, the stroke limiter including a plurality of adjusting plates; a carrier supported adjacent to the rod; pivot structure supporting the adjusting plates from the carrier; and wherein the adjusting plates are individually pivotable about the pivot structure between a first position offset from the rod and a second position engaging the rod, the adjusting plates providing an adjustable stop between the rod and the frame section, the number of plates in the second position determining the maximum stroke of the linkage.

2. The stroke limiter as set forth in claim 1 wherein the adjusting plates include slots positionable over the rod when the plates are moved to the second position.

3. The stroke limiter as set forth in claim 1 wherein the adjusting plates comprise thin, planar members pivotable in sequence to engage the rod to provide an adjustable thickness, solid stop between the rod and the frame section.

4. The stroke limiter as set forth in claim 1 wherein the rod comprises a connecting linkage between the a cylinder and a lift wheel assembly.

5. The stroke limiter as set forth in claim 4 wherein the rod includes a plate receiving portion, a lift wheel connecting portion offset from the plate receiving portion, and a lost motion connection connecting the lift wheel connecting portion and the plate receiving portion and permitting movement of the lift wheel connecting portion while the adjusting plates remain stationary.

6. The stroke limiter as set forth in claim 5 including a retainer located on the plate receiving portion, and a spring supported by the plate receiving portion and biasing the plates that are in the second position against each other and against the retainer.

7. The stroke limiter as set forth in claim 6 including a handle connected to the retainer, the lost motion connection facilitating movement of the retainer for changing the number of plates in the second position.

8. The stroke limiter as set forth in claim 1 wherein the carrier is connected to the rod, and indexing structure maintaining the plates in selected positions.

9. In a lift control system for an implement including a frame section adapted for movement over the ground, the lift control system including a frame lift linkage and a link movable axially relative to the frame section between first and second stroke positions, a stroke limiter for limiting the stroke of the link as the link moves toward the second stroke position and thereby determining a position of a portion of the implement relative to the ground, the stroke limiter including:

a plurality of adjusting plates;

a plate support mounting the adjusting plates adjacent the link for movement between engaged and disengaged positions relative to the link;

a stop member supported adjacent the plate support; and wherein the adjusting plates in the engaged positions are sandwiched between the stop member and the plate support as the link moves toward the second stroke position to limit movement of the link beyond a preselected position.

10. The stroke limiter as set forth in claim 9 wherein the plate support is mounted on the link.

11. The stroke limiter as set forth in claim 10 wherein the plates are flat and juxtaposed, each plate individually pivotable relative to the other plates, and wherein the number of plates in the engaged position determines the maximum stroke of the link.

12. The stroke limiter as set forth in claim 11 wherein the plates include side slots positionable over the link when moved to the engaged positions.

13. The stroke limiter as set forth in claim 10 wherein the link includes a rod, and the plate support is mounted on the rod at an extremity of the rod and includes a handle member axially biased relative to the rod for facilitating movement of the adjusting plates between the engaged and disengaged positions.

14. The stroke limiter as set forth in claim 13 wherein the rod has a rod axis, and wherein the adjusting plates are pivotable about an axis parallel to the rod axis between the engaged and disengaged positions.

15. The stroke limiter as set forth in claim 9 wherein the link includes first and second link portions, and a lost motion connection between the first and second link portions, wherein the plate support is movable relative to the first link portion and facilitates movement of the adjusting plates between the engaged and disengaged positions when the link is in or adjacent the first stroke position.

16. A cylinder controlled lift system for an agricultural implement with a frame, the lift system including a link member movable in generally a linear path in first and second directions with movement of a cylinder piston, a mechanical stroke limiter comprising:

a stop portion supported from the frame adjacent the link member;

a plurality of gauge plates supported adjacent the stop portion, each gauge plate supported for movement between a disengaged position offset from the link member and an engaging position adjacent the link member, the gauge plates located in the path for engagement with the stop portion when in the engaging position to mechanically limit the movement of the link member in the first direction;

wherein the number of gauge plates in the engaging position determine a stop position of the link member as the link member moves in the first direction; and wherein the gauge plates are supported from the link member and the stop portion is fixed to the frame.

17. A cylinder controlled lift system for an agricultural implement with a frame, the lift system including a link member movable in generally a linear path in first and second directions with movement of a cylinder piston, a mechanical stroke limiter comprising:

a stop portion supported from the frame adjacent the link member;

a plurality of gauge plates supported adjacent the stop portion, each gauge plate supported for movement between a disengaged position offset from the link member and an engaging position adjacent the link member, the gauge plates located in the path for engagement with the stop portion when in the engaging position to mechanically limit the movement of the link member in the first direction;

wherein the number of gauge plates in the engaging position determine a stop position of the link member as the link member moves in the first direction; and wherein the gauge plates include flat juxtaposed plates, the stroke limiter further including a carrier rotatably mounting the plates for movement between the disengaged and engaging positions.

18. The stroke limiter as set forth in claim 17 wherein the carrier is spring biased to sandwich the gauge plates which are in the engaging positions against the stop portion.

19. The stroke limiter as set forth in claim 18 wherein the link member includes first and second portions connected by a lost motion connection for limiting movement of the gauge plates and for facilitating movement of the carrier against the spring bias when the gauge plates are moved between the disengaged and engaging positions.

* * * * *